United States Patent [19]

Stanton et al.

[11] Patent Number: 5,245,473

[45] Date of Patent: Sep. 14, 1993

[54] APPARATUS AND METHOD FOR LASER VELOCITY INTERFEROMETRY

[75] Inventors: Philip L. Stanton, Bernalillo County; William C. Sweatt, Albuquerque; O. B. Crump, Jr., Albuquerque; Lloyd L. Bonzon, Albuquerque, all of N. Mex.

[73] Assignee: Sandia Corporation, Albuquerque, N. Mex.

[21] Appl. No.: 722,995

[22] Filed: Jun. 28, 1991

[51] Int. Cl.$^5$ .................................................. G01B 9/02
[52] U.S. Cl. ...................................... 359/577; 356/345
[58] Field of Search ........................ 359/577, 586, 583; 356/28.5, 345, 352

[56] References Cited

U.S. PATENT DOCUMENTS

| | | | |
|---|---|---|---|
| 3,181,088 | 4/1965 | Lewin et al. | 333/11 X |
| 3,490,847 | 1/1970 | Berz et al. | 350/96.1 X |
| 3,647,285 | 3/1972 | Harvey et al. | 350/319 |
| 4,101,199 | 7/1978 | Christensen | 350/152 |
| 4,334,779 | 6/1982 | Domey et al. | 356/358 |
| 4,411,492 | 10/1983 | Bluege | 350/173 |
| 4,509,830 | 3/1985 | Kato et al. | 350/394 |
| 4,632,548 | 12/1986 | Gunter, Jr. et al. | 356/28.5 |
| 4,666,296 | 5/1987 | Bailly-Salins | 356/28.5 |
| 4,717,240 | 1/1988 | Gilby | 350/163 |
| 5,088,815 | 2/1992 | Garnier et al. | 356/28.5 |

OTHER PUBLICATIONS

"Laser Interferometry for Measuring High Velocities of Any Reflecting Surface" by L. M. Barker et al *Journal of Applied Physics*, vol. 43:11 (Nov. 1972).

"Velocity Sensing Interferometer (VISAR) Modification" by W. F. Hemsing *Rev. Science Instrum.*, vol. 50:1 (Jan. 1979).

"Correction to the Velocity-Per-Fringe Relationship for the VISAR Interferometer" by L. M. Barker et al *Journal Applied Physics*, vol. 45:8 (Aug. 1974).

"Optically Recording Interferometer for Velocity Measurements with Subnanosecond Resolution" by D. D. Bloomquist et al *Journal of Applied Physics*, vol. 54:4 (Apr. 1983).

"VISAR: Interferometer Quadrature Signal Recording by Electronic Streak Camera" by W. F. Hemsing *Proceedings of the Eighth Symposium (International) on Detonation* Albuquerque, New Mexico 1985.

"Velocity Interferometry of Miniature Flyer Plates with Sub-Nanosecond Time Resolution" by N. I. Montoya, et al *Proceedings of SPIE High Speed Conference* San Diego, Calif. 1990.

News article published in *Photonics Spectra*, "Laser-Light Speed Trap" Sep. 1990, p. 78.

News article published in *Optics & Laser Technology* "Simplified, Smaller System Studies Shock Waves": vol. 22, No. 5; Oct. 1990.

News article published in *Technology* "Sandia Compacts Interferometer".

News article published in *Inside R&D* "Simplified, Easier-to-Operate Interometer for Shock Motion"; vol. 19, No. 33; Aug. 15, 1990.

Primary Examiner—Mark Hellner
Attorney, Agent, or Firm—Timothy D. Stanley

[57] ABSTRACT

An apparatus and method for laser velocity interferometry employing a fixed interferometer cavity and delay element. The invention permits rapid construction of interferometers that may be operated by those non-skilled in the art, that have high image quality with no drift or loss of contrast, and that have long-term stability even without shock isolation of the cavity.

29 Claims, 3 Drawing Sheets

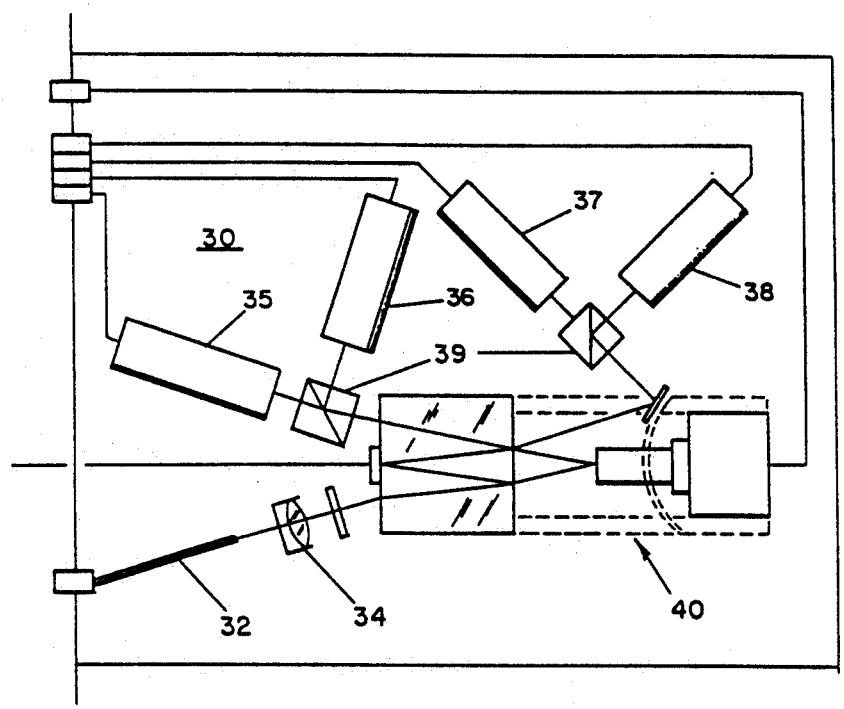
FIG—3
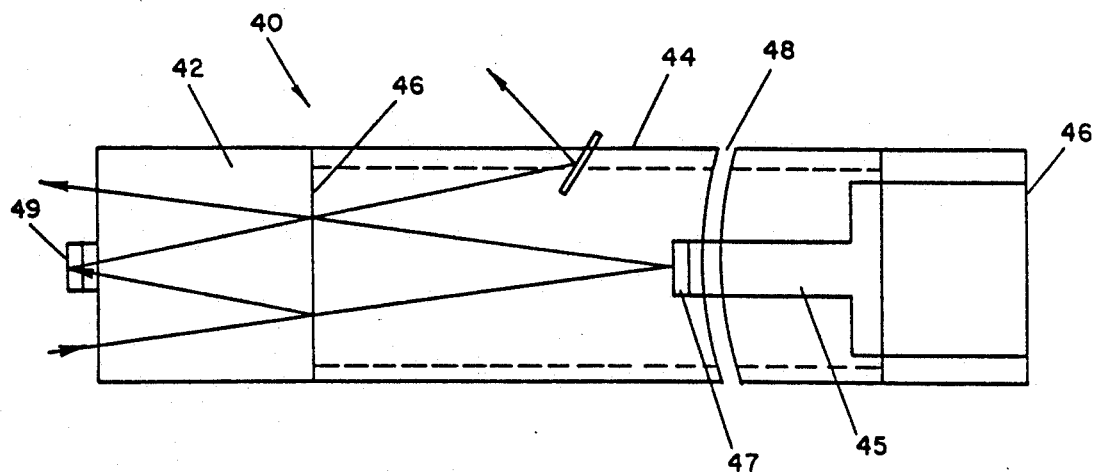
FIG—4

APPARATUS AND METHOD FOR LASER VELOCITY INTERFEROMETRY

GOVERNMENT RIGHTS

The U.S. Government has a paid-up license in this invention and the right in limited circumstances to require the patent owner to license others on reasonable terms as provided for by certain contract terms.

BACKGROUND OF THE INVENTION

1. Field of the Invention (Technical Field)

The present invention relates to an apparatus and method for laser velocity interferometry, which apparatus and method employ a fixed interferometer cavity and delay element.

2. Background Art

Laser velocity interferometry is a widely used method for measurement of shock wave phenomena. The method was first introduced by L. M. Barker & R. E. Hollenbach, "Laser Interferometry for Measuring High Velocities of Any Reflecting Surface." *J. Appl. Phys.* vol. 43, no. 11, (November 1972). Barker and Hollenbach employed an unequal leg Michelson interferometer in which monochromatic light reflected from a moving target is split by a beamsplitter mirror and traverses two unequal paths. Interference is produced by which Doppler-induced changes in the frequency of the light beam reflected off the moving target may be measured.

A major modification to the basic method was set forth in W. F. Hemsing, "Velocity Sensing Interferometer (VISAR) Modification," *Rev. Sci. Instrum.* vol. 50, no. 1, (January 1979). Hemsing employs a differential amplifier to sum both recombined beams from the beamsplitter. The advantages of this modification are a stronger signal, rejection of unwanted self-light from the target, and simplified data reduction.

U.S. Pat. No. 4,334,779, to Domey, et al., entitled *Non-Contact Optical Apparatus for Measuring the Length or Speed of a Relatively Moving Surface*, discloses laser velocimeter apparatus which measures length or relative speed of a moving object.

U.S. Pat. No. 4,101,199, to Christensen, entitled *Radiation Beam Splitter*, also discloses laser velocimeter structure comprising multiple lasers and prisms, but no interferometer.

U.S. Pat. No. 4,632,548, to Gunter, Jr., et al., entitled *Protection Lens Scanning Laser Velocimeter System*, likewise fails to disclose interferometer structure for velocity measurement.

U.S. Pat. No. 4,717,240, to Gilby, entitled *Interferometeric Beamsplitter*, discloses a mechanical resonator driven by optical energy.

U.S. Pat. No. 4,666,296, to Bailly-Salins, entitled *Velocity Interferometer with Continuously Variable Sensitivity*, while a true velocity interferometer, employs a water column delay element that is not of unitary assembly.

Laser velocity interferometry requires very precise alignment and adjustment of optical elements. In the prior art, interferometers are built on optical "breadboard" tables, using commercial mounts for the optical elements. Frequent adjustment by expert personnel is required to maintain high contrast of the interference signals.

The present invention solves this adjustment problem by use of a "fixed-cavity" design in which the critical interferometer cavity elements are aligned and then permanently bonded together during assembly, thus providing a high quality interferometer cavity with a fixed velocity sensitivity which requires no further adjustment. This enables operation by relatively unskilled personnel having only minimal training.

SUMMARY OF THE INVENTION (DISCLOSURE OF THE INVENTION)

The present invention relates to a system and method for measuring shock wave phenomena. The system and method comprise producing a light beam, such as a laser beam; reflecting the light beam from a moving target and producing a reflected light beam; and measuring the Doppler effect of the reflected light beam with a fixed cavity interferometer.

The preferred embodiment utilizes a target coupling module to couple the reflected light beam from the moving target. This target coupling module may comprise an apertured mirror and dichroic mirror, and may further comprise a video camera. The fixed cavity interferometer may comprise an integral Michelson interferometer. The preferred embodiment may further comprise a pulse generator module, a DC supply module, a radiofrequency (RF) amplifier module, an analog-to-digital converter/recorder module, and a computer module.

The invention further relates to a fixed cavity interferometer module and method for using the interferometer module comprising: admitting a reflected light beam; collimating and filtering the reflected light beam; producing first and second output beams from the reflected light beam with the fixed cavity interferometer; detecting the first output beam with a first photomultiplier set; and detecting the second output beam with a second photomultiplier set. In the preferred embodiment, optical fibers are used to admit the reflected light beam, such as a laser beam. The fixed cavity interferometer module further comprises an integral delay bar, a beamsplitter, a slotted element, such as a cylinder, and an integral light retarder.

The present invention further relates to a fixed cavity interferometer comprising: a first portion comprising a first light path, the first portion further comprising a material having a first index of refraction; a second portion comprising a second light path, the second portion further comprising a material having a second index of refraction; and a third portion intermediate the first portion and the second portion; wherein the first portion, the second portion, and the third portion are integrally joined. In the preferred embodiment, the first portion material comprises glass, the second portion material comprises an air-filled element, and the third portion comprises a beamsplitter. The first light path is preferably longer than the second light path, which may comprise an integral light retarder. This integral light retarder may comprise retarding one polarization component of a light beam relative to another polarization component of the light beam. The preferred embodiment may further comprise an actuator for adjusting the second light path, such as providing rectilinear adjustment to the second light path, tilt adjustment for the second light path, and a piezoelectric element. This actuator may also comprise a magnetostrictive element and three independently controllable supports.

A primary object of the invention is to provide a laser velocity interferometer with high-quality velocity measurement performance without the need for frequent adjustment.

Another object of the invention is to provide a laser velocity interferometer which may be operated by one not skilled in the art.

A primary advantage of the invention is its simplicity and ruggedness in contrast to the interferometers of the prior art.

Another advantage of the invention is the reduced time need to set up and operate an interferometer of the invention.

An additional advantage of the invention is that the interferometer cavity need not be shock isolated.

Yet another advantage of the invention is that it provides an interferometer with no drift or loss in contrast as well as long-term stability.

A further advantage of the invention is its minimization of the number of reflections surfaces, thus producing fewer spurious reflections and better image quality than with the prior art.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

FIG. 3 is a schematic diagram of the fixed cavity interferometer module of the invention; and FIG. 4 is a schematic drawing of the fixed cavity interferometer of the invention.

DESCRIPTION OF THE PREFERRED EMBODIMENTS (BEST MODES FOR CARRYING OUT THE INVENTION)

The velocity interferometer system of the present invention measures, with high precision changes in the velocity of a target by sensing the Doppler shift of laser light reflected off the moving target. It is generally used to measure high accelerations, such as those associated with detonation or mechanical shock.

The Doppler shift is measured using an unequal-path Michelson interferometer. This apparatus splits the reflected light from the moving target into two beams traversing unequal light path lengths. Recombination of the beams produces interference; wavelength changes due to Doppler shift result in changes of the phase of the interference in the recombined beams. Such phase changes are measured by photomultiplier tubes, converted to digital data, and stored and processed by a computer. The computer analyzes the data and produces velocity-time records with an accuracy error of less than one percent.

Figure 1:
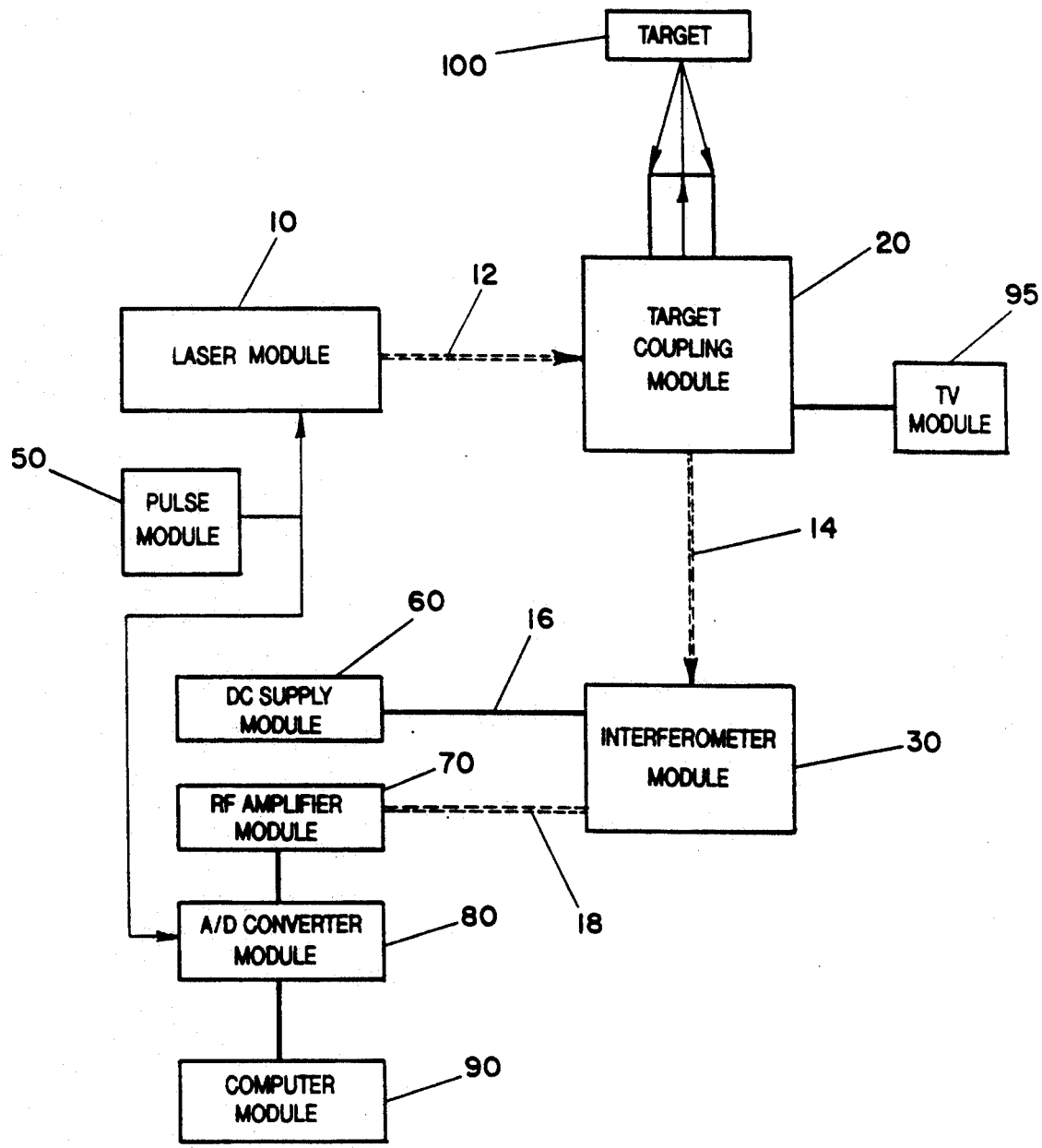
FIG. 1 is a simplified block diagram of the system of the invention.

Reference is now made to the drawings, which illustrate the preferred embodiment of the invention. The simplified block diagram of FIG. 1 depicts the velocity interferometer system of the invention. Module 10 comprises the laser and associated optics module. Lasers useful in any continuous-wave, single frequency, single line laser application, for example, argon or infra red lasers, are acceptable for use in the present invention. Commercial models, for example, the LEXEL Model 95-5, are also acceptable. Normally, the laser module is located in an area providing adequate power and cooling water.

The laser module 10 further comprises an acousto-optic modulator which limits light pulse duration. Limited light pulse duration is necessary to ensure that photomultiplier circuits operate at low duty cycle to maintain specified average current and linearity, and to limit average power in the optical fibers to prevent heat damage.

Figure 2:
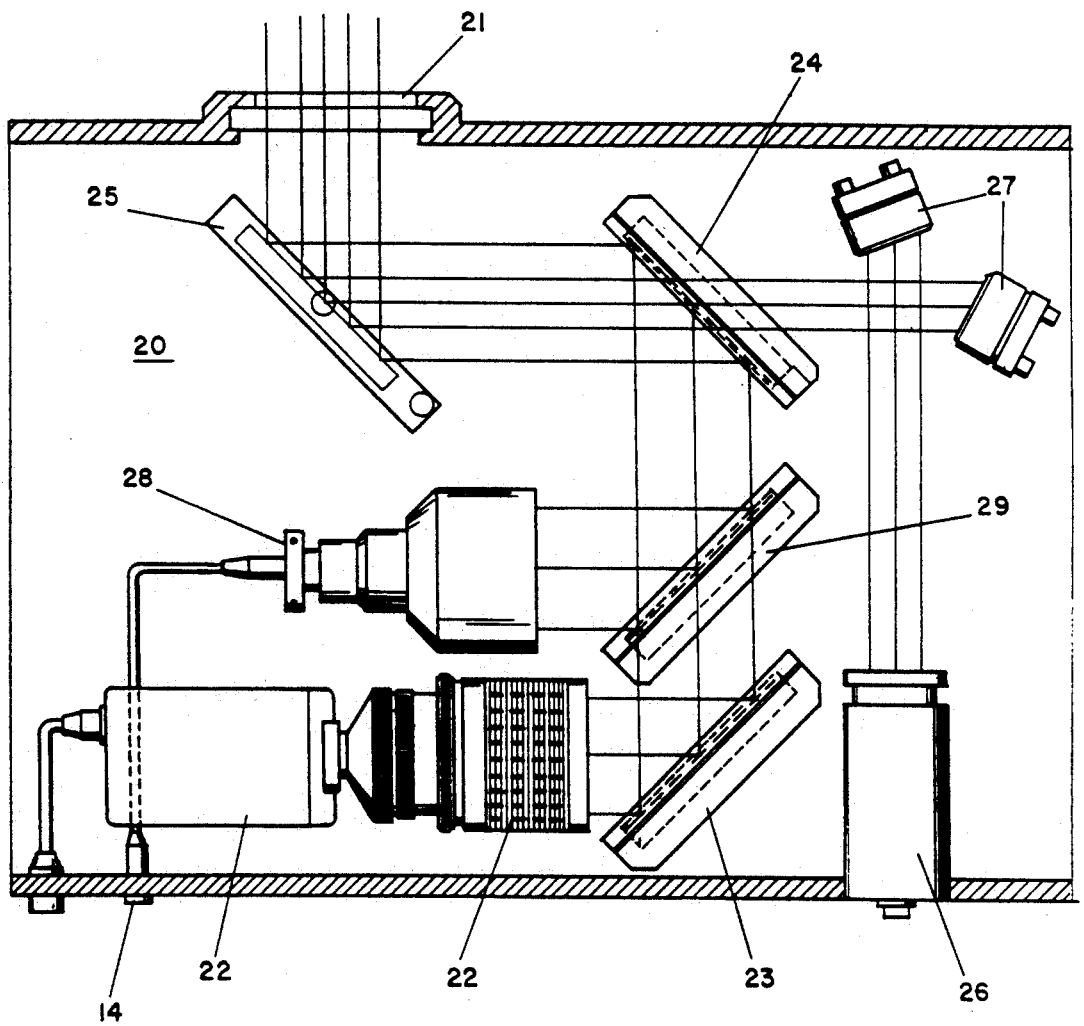
FIG. 2 is a schematic diagram of the target coupling module of the invention.

Target coupling module 20 directs laser light from laser module 10, received via optical fiber 12, to target 100, and receives the reflected return signal. Target coupling module 20, depicted in FIG. 2, further comprises television camera and lens 22, apertured mirror 24, fiber collimator 26, telescope and fiber coupler 28, dichroic mirror 29, and mirrors 23, 27, and 25.

In operation, light arriving from laser module 10 is collimated by fiber collimator 26, reflected through an approximate 90° angle by mirrors 27, and transmitted through apertured mirror 24. After reflection by mirror 25 through aperture 21 to target 100, reflected light from target 100 transits aperture 21, is reflected by mirror 25, apertured mirror 24, dichroic mirror 29, and reduced through telescope and fiber coupler 28. Fiber 14 transmits most of the reflected light to interferometer module 30. The remainder of the reflected light is routed to television camera 22. providing a high-magnification view of target 100, in turn providing alignment and focus checks of target 100, as well as permitting continuous viewing of target 100 before, during, and after a test.

Interferometer module 30, depicted in FIG. 3, is the quintessential modular component of the system. Reflected laser light traverses optical fiber 32, into collimating lens assembly 34. This reoriented and filtered laser light is then directed into fixed-cavity interferometer 40.

Fixed-cavity interferometer 40. as depicted in FIG. 4, basically comprises two components of dissimilar indices of refraction. Delay bar 42 preferably comprises glass having a relatively high index of refraction, for example, SF-11 glass (n≈1.798), or BAK-2 glass (n≈1.534). Slotted glass cylinder 44 is open to the ambient atmosphere (n≈1.00). Delay bar 42 and slotted glass cylinder 44 are bonded, cemented, welded, or otherwise joined at 46. Preferably, juncture 46 comprises a coating and glued joint that together give juncture 46 a beam-splitter function.

Fixed-cavity interferometer 40 further comprises actuator 43. Actuator 43 comprises mirror 47 mounted upon actuator 43 arm 45. Actuator arm 45 is retractable as well as extendible depending upon the polarity and magnitude of the applied voltage. Piezoelectric actuator 43 further comprises three separately energizable and actuable legs, thereby providing mirror 47 with a tilt capability. Other types of actuators, for example, magnetostrictive actuators, could also be used.

Fixed cavity interferometer also comprises integral light retarder 49. Basically ⅛ wave retardation plate and mirror 49 delays one polarization component of the beam by ⅛ of a wavelength relative to the other. The beam traverses retarder 49 twice, delaying the P-component by ¼ wavelength relative to the S-component.

The unique "V-W" light paths of the fixed-cavity interferometer maintain beam planarity, thereby resulting in high quality data. Further, the extra internal transits of light in delay bar 42 simplify the interferometer structure.

Light entering fixed cavity interferometer 40 from optical fiber 32 and collimating lens and filter assembly 34 transits delay bar 42 and impinges beamsplitter 46 at a relatively small angle of incidence. This relatively small angle of incidence avoids the problem of achieving 50% reflectivity for both the S-component and P-Component polarizations. A large angle of incidence, coupled with the probability that the relative phase between the two polarizations is not zero, would substantially reduce the contrast of the resultant fringes.

Further, the small angle of incidence simplifies fabrication of the beamsplitter coating; S-component and P-component polarizations are effectively and nearly optimally reflected by the same coating. The relative phase is essentially zero.

Fixed-cavity interferometer 40 also comprises spherical joint 48. Spherical joint 48 provides an initial adjustment for beam and component alignment; after such alignment is attained, spherical joint 48 is fixed, as by ultra-violet welding, cementing, or other means well known to those ordinarily skilled in the art. This joint permits motion about two axes but prevents translation along the third axis, resulting in near-perfect initial alignment.

Fine adjustment of beam alignment, if required, is further provided by selective energization of actuator 46. Fixed-cavity interferometer 40, by virtue of being an integral assembly, obviates component alignment and adjustment, shock mounting and isolation, adverse polarization effects, and a requirement for skilled operators.

Again referring to FIG. 3, interferometer module 30 further comprises photomultiplier tubes (PMTs) 35, 36, 37, and 38. The PMTs are operated in "push-pull" fashion in pairs or sets, thus reducing unwanted signals from noise and target self-light. Light is admitted to each associated pair of PMTs 35,36 and 37,38, by polarizing beamsplitter cubes 39.

In operation, reflected laser light from moving target 100, after traversing target coupling module 20, enters interferometer module 30 via optical fiber 14. After collimating and filtering by collimating lens assembly 34, the reflected laser light obliquely enters delay bar 42 and is both reflected and refracted by beamsplitter 46. The reflected portion of the beam traverses delay bar 42 and the λ/8 plate 49, and is also reflected by the mirror on the ⅛ wave plate or retarder 49 back to beamsplitter 46. The refracted portion is reflected by mirror 47. Reflection and refraction again occurs, resulting in first and second beam outputs from interferometer 40. Stated differently, the "object" is the exit face of optical fiber 14. A view back into the interferometer would present two images of the optical fiber. These images must be exactly superimposed (that is, in registration laterally and axially) on one another for good interference.

Axial registration occurs when the reduced lengths of the two legs, that is, the glass leg and the air leg, are equal:

$$l(air)/n(air) = l(glass)/n(glass) + l(\lambda/8)/n(\lambda/8).$$

where l and n are the lengths and indices of refraction of the components of the optical paths, respectively. Given this condition, lateral registration occurs when one of the end mirrors 47 and the image of the mirror and ⅛ wave 49, as seen in the beamsplitter 46, are parallel.

Intensity changes occur in the output of the interferometer as target 100 velocity changes because: (1) the light reflected off target 100 is Doppler shifted; and (2) there is an optical path difference between the two legs of the interferometer. The relative phase of the light from the two legs of the interferometer is equal to the optical path difference between legs divided by the wavelength of the light. The Doppler effect changes the wavelength.

Optical path difference (OPD) is equal to:

$$OPD = 2[l(glass) * n(glass) + l(\lambda/8) * n(\lambda/8) - l(air)].$$

The target velocity that will cause a relative phase shift of $2 * \pi$ is called the velocity per fringe (VPF):

$$VPF = \lambda * c/(2 * OPD),$$

where $\lambda$ = wavelength and c = speed of light constant. λ/8 plate retarder and mirror 49 delays one polarization component of the beam relative to the other. The beam traverses the λ/8 plate twice delaying the P-component by ¼ wavelength relative to the S-component. The two components are analyzed separately to produce quadrature encoding of the interference phase.

As an option, delay bar 42 material, for example, glass, could be positioned to the right of beamsplitter 46, as viewed in FIG. 4. Concomitantly, delay bar 42 material on the left of beamsplitter 46, could then be reduced. This, of course, is due to an offset or cancellation effect.

With reference again to the system depicted in FIG. 1, pulse generator module 50 provides square wave pulses to laser module 10 and analog-to-digital (A/D) converter module 80. Pulse generator module 50 is an off-the-shelf commercial model of the type manufactured by Hewlett-Packard, for example.

DC supply module 60 may also be a commercially available AC-to-DC converter, such as, for example, a GAMMA RESEARCH PRODUCT RC-10. DC supply module 60 provides power to interferometer module 30 to operate the PMTs as well as power the actuator.

Radiofrequency (RF) amplifier module 70 sums and amplifies the outputs of the PMTs before such outputs are digitized by A/D converter module 80. The RF amplifier module 70 may comprise, for example, COMLINEAR CLC-100 amplifiers.

A/D converter/recorder module 80, for example, a TEKTRONIX 602 model or parallel encoder, transforms the analog output of the RF amplifier module 70 into digital output suitable for input into computer module 90. Computer module 90, for example, a PDP-11 acquires data from A/D converter module 80, stores the data, and processes the data to produce interference phase and velocity records. Other modifications will occur to those ordinarily skilled in the art. While optical fibers are desirable light transmission devices, their use, of course, is optional.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. An optical device comprising a fixed cavity interferometer comprising:
   a first portion having a first index of refraction and containing a first light path;
   a second portion having a second index of refraction less than said first index of refraction and containing a second light path, said second portion being integrally joined and directly connected to said first portion;
   beam splitter means intermediate said first portion and said second portion for directing light entering said device into said first and second light paths to produce interfering first and second beam outputs.

2. The invention of claim 1 further comprising a fixed cavity interferometer module comprising:
   means for admitting a reflected light beam;
   means for collimating and filtering said reflected light beam;
   said fixed cavity interferometer means producing first and second output beams from said reflected beam;
   first means for detecting said first output beam; and
   second means for detecting said second output beam.

3. The invention of claim 2 further comprising a system for measuring shock wave phenomena comprising:
   means for producing a light beam; and
   means for reflecting said light beam from moving target means and producing a reflected light beam;
   said fixed cavity interferometer means measuring the Doppler effect of said reflected light beam.

4. The invention of claim 3 wherein said means for producing a light beam comprises laser means.

5. The invention of claim 3 wherein said means for reflecting said light beam from said moving target means comprises target coupling module means.

6. The invention of claim 5 wherein said target coupling module means further comprises apertured mirror means.

7. The invention of claim 5 wherein said target coupling module means further comprises dichroic mirror means.

8. The invention of claim 5 wherein said target coupling module means further comprises video camera means.

9. The invention of claim 3 wherein said fixed cavity interferometer means comprises integral Michelson interferometer means.

10. The invention of claim 3 further comprising pulse generator module means.

11. The invention of claim 3 further comprising DC supply module means.

12. The invention of claim 3 further comprising radiofrequency amplifier module means.

13. The invention of claim 3 further comprising analog-to-digital converter module means.

14. The invention of claim 3 further comprising computer module means.

15. The invention of claim 2 wherein said means for admitting a reflected light beam comprises optical fiber means.

16. The invention of claim 2 wherein said reflected light beam is a reflected laser beam.

17. The invention of claim 2 wherein said fixed cavity interferometer module further comprises an integral delay bar means, beamsplitter means, and slotted element means.

18. The invention of claim 17 further comprising integral light retardation means.

19. The invention of claim 1 wherein said first portion material comprises glass.

20. The invention of claim 1 wherein said second portion material comprises an air-filled element.

21. The invention of claim 1 wherein said first light path is longer than said second light path.

22. An optical device comprising a fixed cavity interferometer comprising:
   a first portion having a first index of refraction less than said first index of refraction and containing a second light path, said second portion being integrally joined and directly connected to said first portion, and
   beam splitter means intermediate said first portion and said second portion for directing light entering said device into said first and second light paths; wherein said first and second light paths are recombined to produce an interfering output beam.

23. The invention of claim 22 wherein said integral light retardation means comprises means for retarding one polarization component of a light beam relative to another polarization component of said light beam.

24. An optical device comprising a fixed cavity interferometer comprising:
   a first portion having a first index of refraction and containing a first light path;
   a second portion having a second index of refraction less than said first index of refraction and containing a second light path, said second portion being integrally joined and directly connected to said first portion;
   beam splitter means intermediate said first portion and said second portion for directing light entering said device into said first and second light paths; wherein said first and second light paths are recombined to produce an interfering output beam; and
   actuator means for adjusting said second light path, wherein said actuator means is connected to said second portion at a shared spherical joint.

25. The invention of claim 24 wherein said actuator means provides rectilinear adjustment to said second light path.

26. The invention of claim 24 wherein said actuator means provides tilt adjustment for said second light path.

27. The invention of claim 24 wherein said actuator means comprises piezoelectric means.

28. The invention of claim 24 wherein said actuator means comprises magnetostrictive means.

29. The invention of claim 24 wherein said actuator means further comprises three independently controllable support means.

* * * * *